(12) United States Patent
Schmitz et al.

(10) Patent No.: US 11,012,502 B2
(45) Date of Patent: May 18, 2021

(54) METHOD FOR OPERATING A DECENTRALIZED COMPUTING NETWORK, IN PARTICULAR AN EDGE CLOUD COMPUTER OF THE DECENTRALIZED COMPUTING NETWORK

(71) Applicant: VOLKSWAGEN AKTIENGESELLSCHAFT, Wolfsburg (DE)

(72) Inventors: Steffen Schmitz, Wesel (DE); Jens Kampermann, Haan (DE); Karthik Satyanarayana, Bochum (DE); Sebastian Gehrling, Essen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/724,824

(22) Filed: Dec. 23, 2019

(65) Prior Publication Data

US 2020/0204614 A1 Jun. 25, 2020

(30) Foreign Application Priority Data

Dec. 21, 2018 (DE) .................... 10 2018 009 977.7
Jan. 25, 2019 (DE) .................... 10 2019 200 924.7

(51) Int. Cl.
*H04L 29/08* (2006.01)

(52) U.S. Cl.
CPC ............ *H04L 67/10* (2013.01); *H04L 67/26* (2013.01); *H04L 67/32* (2013.01)

(58) Field of Classification Search
CPC ......... H04L 67/12; H04L 67/26; H04L 67/32; H04L 67/10
USPC ...................................................... 709/201
See application file for complete search history.

(56) References Cited

U.S. PATENT DOCUMENTS

| | | | | |
|---|---|---|---|---|
| 2013/0311551 | A1* | 11/2013 | Thibeault | H04L 41/0806 709/203 |
| 2015/0046591 | A1* | 2/2015 | Zhu | H04L 67/1002 709/226 |
| 2019/0043351 | A1* | 2/2019 | Yang | G06K 9/4604 |

FOREIGN PATENT DOCUMENTS

| | | |
|---|---|---|
| DE | 102007063011 A1 | 6/2009 |
| DE | 102013001747 A1 | 7/2014 |
| KR | 20180098798 A | 9/2018 |

OTHER PUBLICATIONS

Abbas et al.; Mobile Edge Computing: A Survey; IEEE Internet of Things Journal; Feb. 2018; vol. 5, No. 1; pp. 450-465.

Altintas et al.; Making Cars a Main ICT Resource in Smart Cities; The First International Workshop on Smart Cities and Urban Information; IEEE Conference on Computer Communications Workshops (INFOCOM WKSHPS); 2015; pp. 582-587.

Shahzadi et al.; Multi-access edge computing: open issues, challenges and future perspectives; Journal of Cloud Computing Advances, Systems and Applications; 2017; vol. 6, No. 1.

\* cited by examiner

*Primary Examiner* — Frantz B Jean
(74) *Attorney, Agent, or Firm* — Barnes & Thornburg LLP

(57) ABSTRACT

A method for operating an edge cloud computer when providing a computing power to at least one terminal, in particular, a transportation vehicle including detecting resource information at the edge cloud computer, transmitting resource information to the at least one terminal, and providing at least one portion of a computing capacity of the edge cloud computer to the at least one terminal depending on the resource information.

22 Claims, 2 Drawing Sheets

METHOD FOR OPERATING A DECENTRALIZED COMPUTING NETWORK, IN PARTICULAR AN EDGE CLOUD COMPUTER OF THE DECENTRALIZED COMPUTING NETWORK

PRIORITY CLAIM

This patent application claims priority to German Patent Application Nos. 10 2018 009 977.7, filed 21 Dec. 2018, and 10 2019 200 924.7, filed 25 Jan. 2019, the disclosure of which is incorporated herein by reference in its entirety.

SUMMARY

Illustrative embodiments relate to a method for operating an edge cloud computer when providing a computing power to at least one terminal, in particular, a transportation vehicle, to a corresponding edge cloud network, and to a terminal, in particular, a transportation vehicle, which can obtain a computing power from a corresponding edge cloud computer.

BRIEF DESCRIPTION OF THE DRAWINGS

Disclosed embodiment are presented in greater detail below with reference to the figures. Here the features mentioned in the claims and in the description may be essential to the disclosure in each case individually by themselves or in any desired combination. It should be noted here that the figures are merely of descriptive character and are not intended to restrict the disclosure in any form. In the figures:

DETAILED DESCRIPTION

Figure 1:
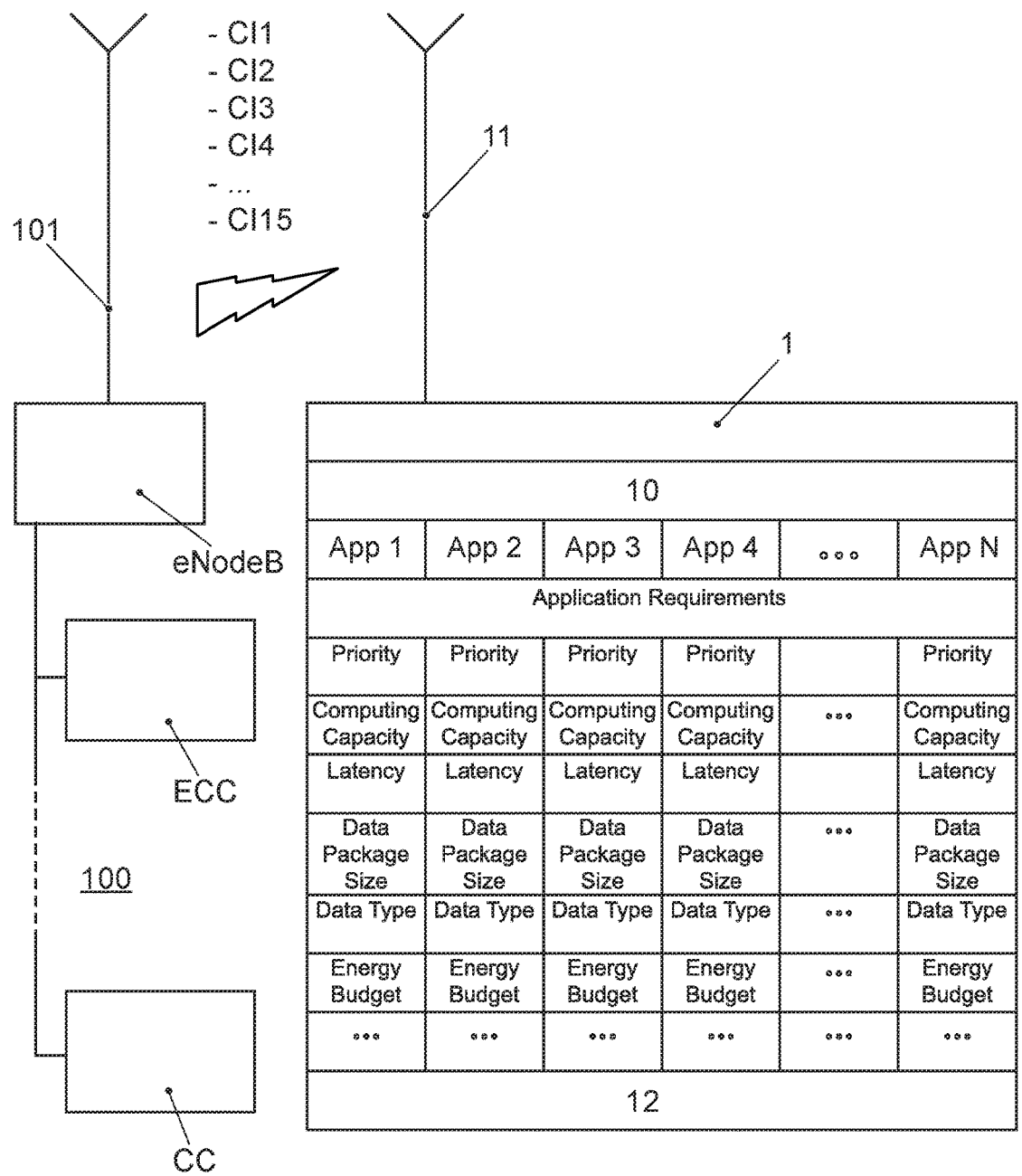
FIG. 1 shows a schematic illustration of an edge cloud computer in the context of an edge cloud network which is operated in accordance with a disclosed method.
Figure 2:
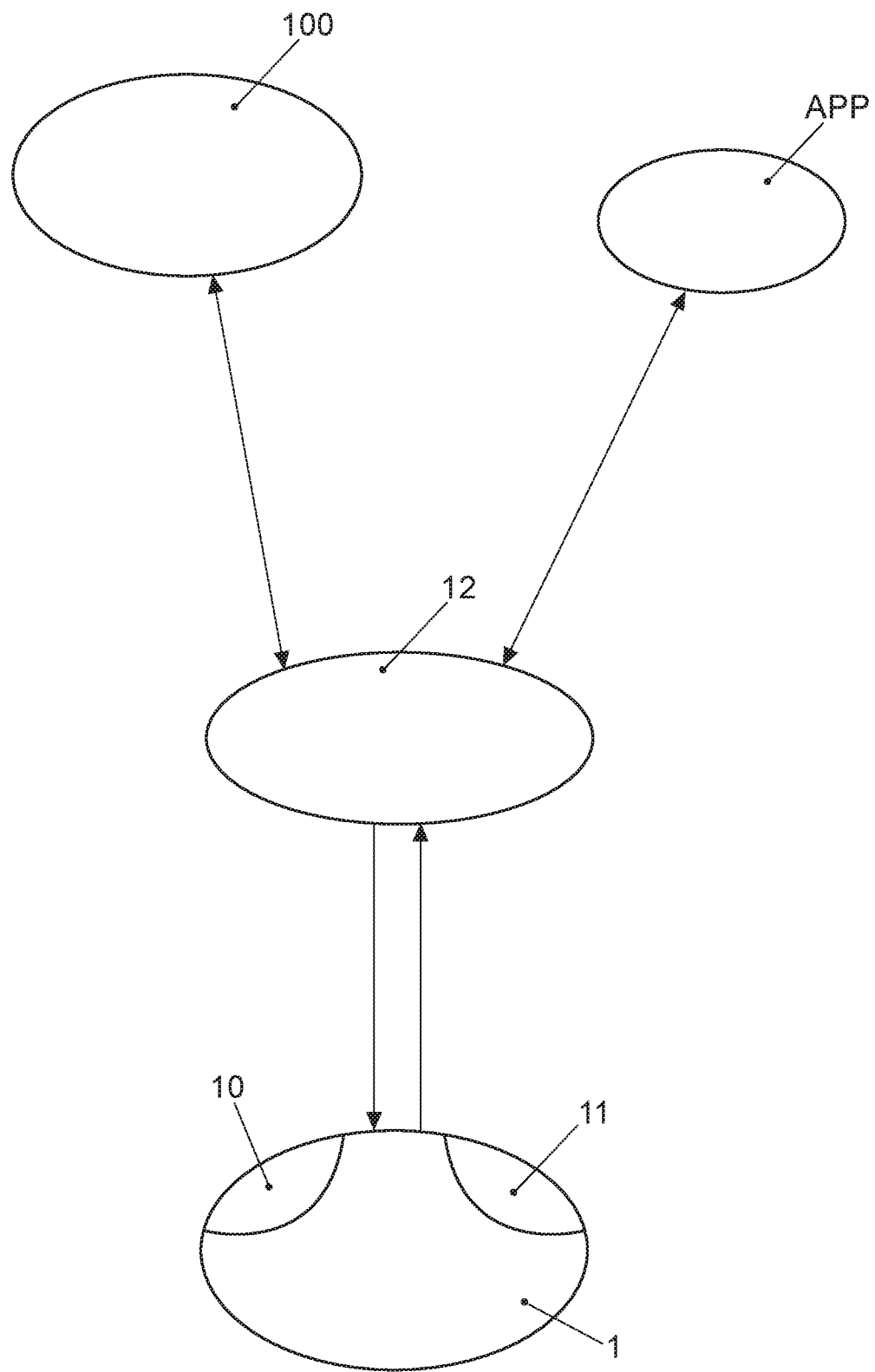
FIG. 2 shows a schematic illustration of a disclosed terminal.

Presently, besides local computer capacities, the computer capacities of the cloud make the necessary computing capacities available. This generally involves a single, fixedly assigned resource. A decision regarding the computer on which a computation operation is intended to be performed in a decentralized manner has thus not been necessary hitherto. Owing to the occurring latencies that arise as a result of the long signal propagation paths, it is not always possible to execute time-critical computation algorithms in a cloud computing capacity.

On account of the necessary computing powers for self-driving transportation vehicles and the necessity of short latencies, particularly in the case of time-critical applications of the self-driving transportation vehicles, it is recommended that specific computation operations be performed in a decentralized manner. This is also expedient particularly in the case of networked transportation vehicles. Besides cloud-based, central computer units, there is increasingly a focus here on edge cloud computers (decentralized units). Such computers are arranged, e.g., in the vicinity of junctions controlled by traffic lights or directly on the transmission masts of radio networks. If a plurality of computers are in this case available, it is necessary to effect a suitable assignment of the computation task to a computer resource. To be able to effect this assignment in line with requirements, suitable information must be made available to the terminal. This necessitates a method that controls when and which items of information are exchanged between the decentralized computer network, in particular, the edge cloud computer within the decentralized computer network, and the terminal.

Disclosed embodiments provide an improved method for operating an edge cloud computer when providing a computing power to at least one terminal, in particular, a transportation vehicle, and also an improved edge cloud network.

Disclosed embodiments make available an improved method which controls when and which items of information are exchanged between the edge cloud computer and the terminal and which makes possible a near-instantaneous, fast and efficient provision of decentralized computing power at the terminal and/or at terminals, in particular, at transportation vehicles. Moreover, disclosed embodiments make possible an improved edge cloud network in which the computing power can be provided rapidly and efficiently. Furthermore, disclosed embodiments make available a corresponding terminal which makes possible an efficient utilization of computing capacities in a corresponding edge cloud network.

This is achieved by an improved method for operating an edge cloud computer when providing a computing power to at least one terminal, in particular, a transportation vehicle, by an improved edge cloud network, and by an improved terminal. Features that are disclosed with respect to the individual facets of the disclosure can be combined with one another in such a way that, with regard to the disclosure, the reference is or can be made always in a reciprocal way.

Disclosed embodiments provide a method for operating an edge cloud computer (and/or a cloud computer) when providing a computing power to at least one terminal, in particular, a transportation vehicle, comprising the following operations:

1) detecting resource information at the edge cloud computer,
2) transmitting resource information to the at least one terminal,
3) providing at least one portion of a computing capacity of the edge cloud computer to the at least one terminal depending on the resource information.

An edge cloud computer can be understood to be a computing node of an edge node network, which computing node has a processor having a computing power and a communication unit for exchanging data, e.g., with another edge cloud computer and/or a terminal. The edge cloud computer can serve for providing computing power at the edge of the edge node network. Via the communication unit, the edge cloud computer can receive data from a terminal, such as, e.g., a transportation vehicle, which the edge cloud computer can process by its own computing power on its processor. The edge cloud computer can send the results of the processing back to the transportation vehicle via the communication unit. The data can be, e.g., sensor data that can be evaluated on the edge cloud computer. Moreover, it is conceivable that the edge cloud computer can undertake various computation tasks for various system applications in the transportation vehicle.

The disclosed embodiments are based on the fundamental concept of utilizing decentralized computer capacities at mobile terminals, in particular, transportation vehicles. This necessitates exchanging information concerning the resources present in the edge cloud computer between the decentralized resources (edge cloud computer and optionally cloud computer) and the terminals (such as, e.g., automatically driving transportation vehicles). The edge cloud computers can be arranged at a limited distance from the terminal (e.g., at junctions, on network masts, road signs etc.). The disclosed embodiment propose push-based communication of information from the edge cloud computer(s) to the terminal possibly making an inquiry or terminal potentially seeking an external computing power. On the one hand, the disclosed embodiments can provide for initially waiting for reception of a request in the edge cloud computer to start the method. On the other hand, however, it is also possible for the method to be carried out regularly, e.g., periodically, even without a request, to make the resource information available in an anticipatory manner to the terminals in the service area of the edge cloud computer, to make possible a near-instantaneous provision of computing capacities in the case of time-critical applications. Furthermore, it is possible that the push-based method can be carried out when the resource situation has changed, to notify the terminal of possible changes to the resource situation. The resources can be utilized with the consent of the decentralized network, wherein, upon each change to the resource situation, the terminal is notified of the change in a push-based manner to give the terminal a renewed opportunity for decision. In this way, the resources within the decentralized network can be utilized in an improved manner.

Operation 1) of the disclosed method involves detecting the relevant resource information at the edge cloud computer. The resource information can comprise the following items of information, inter alia: offered services of the edge cloud computer, free computer capacity on the edge cloud computer, prediction of the service quality (quality of the network connection, inter alia), latency estimation (inter alia can also include the estimation of a complete latency budget), latency budget (encompassing all periods of time from the transmission of the request until the reception of the calculated data at the requesting terminal), monetary costs of the implementation of the application/service, energy costs in the sense of energy budget planning (e.g., in the case of electric transportation vehicle), etc. The edge cloud computer transmits the resource information to the terminal. What is then incumbent upon the terminal is the task of deciding, on the basis of the resource information, where in the edge cloud network a computation operation is to be performed the most expediently. Corresponding computing power is finally provided at a selected edge cloud computer.

The disclosed embodiments thus make possible an efficient provision and distribution of the computing power in an edge cloud network comprising at least one edge cloud computer, optionally a plurality of edge cloud computers, which can be operated as described above. The resource information helps the terminal to carry out a near-instantaneous, fast and efficient selection of an appropriate edge cloud computer to obtain the computing power for a desired system application with reduced latencies from the appropriate edge cloud computer. Even time-critical requirements in transportation vehicles are optimally taken into account here.

Furthermore, in a method for operating an edge cloud computer, the disclosure can provide for the resource information to comprise at least one of the following items of information:
  geographical position,
  connection quality,
  offered services,
  data rate,
  computing power,
  capacity utilization,
  service area,
  temporal availability,
  available computing capacity,
  reliability,
  waiting time,
  energy consumption,
  costs,
  expected route,
  expected speed.

Current and variable information can thus be taken into account, which can be specific to the edge cloud computer. This information is additionally relevant in terms of taking decisions for the suitability of the edge cloud computer for providing a computing power to specific system applications in the terminal, in particular, in a transportation vehicle. An expected route and an expected speed are items of information which can be relevant in the case of the mobile edge cloud computers, to be able to choose an appropriate edge cloud computer which is expected to be situated in the service area of the terminal during a specific time.

Furthermore, in a method for operating an edge cloud computer, the disclosure can provide that it is possible to swap the computing power for at least one of the following system applications at the terminal:
  navigation,
  streaming,
  diagnostics,
  telematics,
  updates,
  information services,
  entertainment,
  data processing,
  gesture recognition,
  voice control,
  evaluation of sensor data,
  fusion of sensor data,
  calculation of driving maneuvers,
  driving assistance functions,
  driving modes in accordance with one of possible degrees of automation when operating the transportation vehicle,
  highly automated and/or autonomous driving.

The services within the terminal, in particular, a transportation vehicle, can thus be improved and extended in a beneficial manner. Customer convenience can be considerably increased as a result.

Furthermore, in a method for operating an edge cloud computer, the disclosure can provide for method operations 1) to 3) to be carried out in response to a request by the terminal. The energy costs on the part of the edge cloud computer can be reduced in this way.

Moreover, in a method for operating an edge cloud computer, the disclosure can provide for method operations 1) to 3) to be carried out periodically. In this way, the edge cloud computer could transmit its resource information not only on request (after reception of a demand signal) but rather permanently at specific times (e.g., predefined by the protocol and known, e.g., to the terminals). The terminal would thus always be able to obtain a picture of the supply situation of the edge cloud computer. In the case of latency-critical applications, the request protocol could be omitted and the latency could thus be reduced accordingly.

Furthermore, it is conceivable for method operations 1) to 3) to be carried out in the event of a change in resource information and/or in a push-based manner. In this way, the method can be carried out in a manner particularly sparing of resources.

Moreover, in a method for operating an edge cloud computer, the disclosure can provide for the resource information to be transmitted according to a multicast, broadcast or geocast principle. Multicast describes the transmission of the resource information from a transmitter to many subscribers. Broadcast involves sending the resource information from a transmitter to all of the subscribers. Geocast describes a principle in which all subscribers in a predefined region receive the resource information.

Furthermore, in a method for operating an edge cloud computer, the disclosure can provide for the edge cloud computer to be embodied as a stationary and/or mobile edge node of a network, a base station of a mobile radio provider and/or a network provider, a cellphone, a smartphone, a tablet computer, a transportation vehicle and/or a drone. A flexible network having extended functions and having improved coverage and connectivity can thus be made available.

Furthermore, a disclosed method can comprise at least one further operation of:
3) determining at least one zone within an edge cloud network having a reduced computing capacity,
4) providing the edge cloud computer into the determined zone having the reduced computing capacity.

An improved edge node network can thus be made possible with the aid of the disclosed embodiments.

Furthermore, disclosed embodiments provide an edge cloud network, comprising at least one edge cloud computer which can be operated as described above. The edge cloud network can comprise a plurality of edge cloud computers. It is conceivable here that the plurality of edge cloud computers can be operated within the meaning of the disclosure. The disclosed edge cloud network furthermore affords the same benefits that have been described above in connection with the disclosed method for operating an edge cloud computer. Reference is made to the benefits within the full scope thereof in the present case.

Moreover, the disclosed embodiments provide a terminal, comprising: a control unit for swapping computing power from the terminal to at least one edge cloud computer (and optionally at least one cloud computer), and a communication unit for receiving resource information from the at least one edge cloud computer (and optionally from the at least one cloud computer) and/or for transmitting a request to the at least one edge cloud computer (and optionally to the at least one cloud computer). The terminal can receive the resource information from a plurality of edge cloud computers (and optionally from the plurality of cloud computers) and/or transmit a request to a plurality of edge cloud computers (and optionally to a plurality of cloud computers). From the plurality of available computers, a computer which is best suited to a desired system application according to the resource information is finally selected. Furthermore, the same benefits that have been described above in connection with the disclosed method for operating an edge cloud computer are afforded with the aid of the disclosed terminal. Reference is made to the benefits within the full scope thereof in the present case.

In addition, the disclosed embodiments can provide for the terminal to be embodied as a transportation vehicle. In this way, the benefits can be implemented in the case of transportation vehicles, which can benefit from the disclosure on account of their mobility and often time-critical applications.

Furthermore, a disclosed terminal can provide a management system to assign at least one application at a terminal to an edge cloud computer depending on its resource information. The terminal, in particular, the transportation vehicle or some systems within the transportation vehicle can send data to the at least one edge cloud computer (and optionally at least one cloud computer), which data are intended to be processed there with the aid of an external computing power if, e.g., a dedicated computing power in the transportation vehicle is not present, is not sufficient or is used in some other way. In this case, the management system helps to select at least one edge cloud computer (from possibly a plurality of nearby edge cloud computers) and/or at least one cloud computer (from possibly a plurality of remote cloud computers) which, from all the available computers, are/is the best suited to implementing a desired system application in the transportation vehicle. For this purpose, the management system can make use of the received resource information and/or application information.

In the different figures, the same technical features are designated by the same reference signs, a technical feature generally being described only once.

FIG. 1 illustrates the disclosed method for operating an edge cloud computer ECC when providing a computing power to at least one terminal, in particular, a transportation vehicle 1, comprising the following operations:
1) detecting resource information CI at the edge cloud computer ECC,
2) transmitting resource information CI to the at least one terminal,
3) providing at least one portion of a computing capacity of the edge cloud computer ECC to the at least one terminal depending on the resource information CI.

An edge cloud computer ECC can be provided at the edge of an edge cloud network 100 and have a processor having a computing power and a communication unit 101 for exchanging data, e.g., with the disclosed terminal, optionally as a transportation vehicle 1. The edge cloud computer ECC can serve for providing computing power at the edge of the edge node network 100. Via the communication unit 101, the edge cloud computer ECC can transmit resource information CI to the at least one terminal and receive data from the transportation vehicle 1, which the edge cloud computer can process by its own computing power on its processor. The edge cloud computer ECC can send the results of the processing back to the transportation vehicle 1 via the communication unit 101. The data can be, e.g., sensor data which can be evaluated on the edge cloud computer ECC. Moreover, it is conceivable that the edge cloud computer ECC can undertake various computation tasks for various system applications APP in the transportation vehicle 1.

In the context of the disclosed embodiments, the transportation vehicle 1 or some systems within the transportation vehicle 1 can send data to at least one edge cloud computer ECC and optionally at least one cloud computer CC, which data are intended to be processed externally there if, e.g., a dedicated computing power in the transportation vehicle 1 is not present, is not sufficient or is used in some other way. According to the disclosed embodiments, it is possible to select at least one edge cloud computer ECC (from possibly a plurality of nearby edge cloud computers) and/or at least one cloud computer CC (from possibly a plurality of remote cloud computers) which are/is suitable for implementing a desired system application APP from or for the transportation vehicle 1.

An edge cloud computer ECC can be embodied as a stationary edge cloud computer ECC, e.g., as a base station of a mobile radio provider and/or a network provider, or as a mobile edge cloud computer ECC. A mobile edge cloud computer ECC within the meaning of the disclosure can be installed flexibly at locations where the computing power is required in transportation vehicles 1, e.g., at road junctions, parking lots, etc. Moreover, the mobile edge cloud computer ECC within the meaning of the disclosure can move while it provides the computing power. A transportation vehicle, e.g., a fleet transportation vehicle, a drone or a mobile base station can be used as a mobile edge cloud computer ECC within the meaning of the disclosure.

The disclosed embodiments utilize decentralized computer capacities as resources for system applications APP in mobile terminals, such as, e.g., transportation vehicles 1. In this case, the edge cloud computer ECC can be situated in the vicinity (e.g., 100 to 500 m) of the transportation vehicle 1 (e.g., at junctions or on other transportation vehicles). Cloud computers CC can in turn be situated in remote computer centers. The edge cloud computers ECC and/or cloud computers CC can be operated. In the case of time-critical applications, in particular, the nearby edge cloud computers ECC are beneficial for avoiding waiting times.

The disclosed method describes how the information is exchanged between the decentralized resources (edge cloud computer ECC and/or cloud computer CC) and the terminal (e.g., an automatically driving transportation vehicle 1), to make possible an improved assignment between an application on the terminal 1 and at least one external computing resource. The edge cloud computers ECC can be arranged in this case at a limited distance from the terminal 1. The disclosed embodiments propose push-based communication of information from the edge cloud computer or from a plurality of edge cloud computers ECC in the context of an edge cloud network 100 to the terminal possibly making an enquiry or terminal potentially seeking an external computing power.

In the context of the disclosure, it is possible initially to wait for reception of a request in the edge cloud computer ECC to start the method. The energy costs on the part of the edge cloud computer ECC can thus be reduced.

Moreover, in the context of the disclosure, it is possible for the method to be carried out regularly, e.g., periodically, even without a request, to regularly to make the resource information CI available to the terminals in the service area of the edge cloud computer ECC, to enable computing capacities to be made available near-instantaneously in the case of time-critical applications.

Operation 1) of the disclosed method involves detecting the relevant resource information CI at the edge cloud computer ECC, such as:
geographical position CI1,
connection quality CI2,
offered services CI3,
data rate CI4,
computing power CI5,
capacity utilization CI6,
service area CI7,
temporal availability CI8,
available computing capacity CI9,
reliability CI10,
waiting time CI11,
energy consumption CI12,
costs CI13,
expected route CI14,
expected speed CI15.

The last two items of resource information CI14 and CU15 can be relevant in the choice of suitable mobile edge cloud computers ECC.

The computing power can be required in the terminal, e.g., for at least one of the following system applications APP:
navigation,
streaming,
diagnostics,
telematics,
updates,
information services,
entertainment,
data processing,
gesture recognition,
voice control,
evaluation of sensor data,
fusion of sensor data,
calculation of driving maneuvers,
driving assistance functions,
driving modes in accordance with one of possible degrees of automation when operating the transportation vehicle,
highly automated and/or autonomous driving.

In the context of the disclosure, it is furthermore conceivable for the resource information CI to be transmitted according to a multicast, broadcast or geocast principle. Multicast describes the transmission of the resource information from a transmitter to many subscribers. Broadcast involves sending the resource information from a transmitter to all of the subscribers. Geocast describes a principle in which all subscribers in a predefined region receive the resource information.

The disclosed embodiments can provide for zones having a reduced computing capacity to be ascertained within an edge cloud network 100 to provide an edge cloud computer ECC into the zones in a targeted manner, which edge cloud computer can be operated as described above. A dynamic edge node network 100 having an improved network coverage and an improved resource distribution can thus be provided with the aid of the disclosed embodiments. A corresponding edge cloud network 100 in the context of the disclosure can comprise a plurality of edge cloud computers ECC which can be operated in accordance with the disclosed method.

A corresponding terminal within the meaning of the disclosure can be as a transportation vehicle 1, in particular, an electric transportation vehicle, and comprise the following elements: a control unit 10 for swapping computing power from the terminal to at least one edge cloud computer ECC (and optionally at least one cloud computer CC) and a communication unit 11 for receiving resource information CI from the at least one edge cloud computer ECC (and optionally from the at least one cloud computer CC) and/or for transmitting a request to the at least one edge cloud computer ECC (and optionally to the at least one cloud computer CC).

The terminal can receive the resource information CI from a plurality of edge cloud computers ECC (and optionally from the plurality of cloud computers CC) and/or transmit a request for a computing power to a plurality of edge cloud computers ECC (and optionally to a plurality of cloud computers CC). From the plurality of available computers ECC, CC, the disclosed terminal, in particular, a management system 12 of the disclosed terminal, can select a computer ECC, CC which, according to the resource information CI, is best suited to a desired system application APP. When choosing an appropriate computer ECC, CC, the management system 12 can make use of the received resource information CI and/or application information about the desired system application APP.

The above description of the figures describes the present disclosure exclusively in the context of examples. It goes without saying that individual features of the disclosed embodiments, in so far as is technically practical, can be freely combined with one another, without departing from the scope of the disclosure.

LIST OF REFERENCE SIGNS

1 Transportation vehicle
10 Control unit
11 Communication unit
12 Management system
100 Edge cloud network
101 Communication unit
APP System application
ECC Edge cloud computer
CC Cloud computer
CI Resource information
CI1 Geographical position
CI2 Connection quality
CI3 Offered services
CI4 Data rate
CI5 Computing power
CI6 Capacity utilization
CI7 Service area
CI8 Temporal availability
CI9 Available computing capacity
CI10 Reliability
CI11 Waiting time
CI12 Energy consumption
CI13 Costs
CI14 Expected route
CI15 Expected speed

The invention claimed is:

1. An edge cloud network comprising
    a plurality of edge cloud computers configured to provide computing power to at least one mobile terminal, the at least one mobile terminal being a transportation vehicle;
    wherein detection of resource information of at least one edge cloud computer of the plurality of edge cloud computers is performed by at least one edge cloud computer of the plurality of edge cloud computers,
    wherein the detected resource information is transmitted to the at least one mobile terminal,
    wherein at least one portion of a computing capacity of at least one edge cloud computer of the plurality of edge cloud computers is provided to the at least one mobile terminal based on the resource information,
    wherein at least one zone is determined within an edge cloud network having a reduced computing capacity, and
    wherein, in response to a determination having a reduced computing capacity, an edge cloud computer of the plurality of edge cloud computers is provided in the determined zone to provide improved resource distribution.

2. The network of claim 1, wherein the resource information comprises at least one of the following items of information: geographical position, connection quality, offered services, data rate, computing power, capacity utilization, service area, temporal availability, available computing capacity, reliability, waiting time, energy consumption, costs, expected route, expected speed.

3. The network of claim 1, wherein it is possible to swap the computing power for at least one of the following system applications at the at least one mobile terminal: navigation, streaming, diagnostics, telematics, updates, information services, entertainment, data processing, gesture recognition, voice control, evaluation of sensor data, fusion of sensor data, calculation of driving maneuvers, driving assistance functions, driving modes in accordance with one of possible degrees of automation when operating the transportation vehicle, highly automated and/or autonomous driving.

4. The network of claim 1, wherein the detection of the resource information at the at least one edge cloud computer of the plurality of edge cloud computers, the transmission of the resource information to the at least one mobile terminal, and the providing of the at least one portion of a computing capacity of the at least one edge cloud computer of the plurality of edge cloud computers to the at least one mobile terminal based on the resource information are performed in response to a request by the at least one mobile terminal.

5. The network of claim 1, wherein the detection of the resource information at the at least one edge cloud computer of the plurality of edge cloud computers, the transmission of the resource information to the at least one mobile terminal, and the providing of the at least one portion of a computing capacity of the at least one edge cloud computer of the plurality of edge cloud computers to the at least one mobile terminal based on the resource information are performed periodically, or the detection of the resource information at the at least one edge cloud computer of the plurality of edge cloud computers, the transmission of the resource information to the at least one mobile terminal, and the providing of the at least one portion of a computing capacity of the at least one edge cloud computer of the plurality of edge cloud computers to the at least one mobile terminal based on the resource information are performed in response to a change in resource information and/or in a push-based state.

6. The network of claim 1, wherein the resource information is transmitted according to a multicast, broadcast or geocast principle.

7. The network of claim 1, wherein the at least one edge cloud computer of the plurality of edge cloud computers is a stationary and/or mobile edge node of a network, a base station of a mobile radio provider and/or a network provider, a cellphone, a smartphone, a tablet computer, a transportation vehicle and/or a drone.

8. A mobile terminal comprising:
    a control unit for swapping computing power from the mobile terminal to at least one edge cloud computer of a plurality of edge cloud computers configured to provide computing power to the mobile terminal; and
    a communication unit for receiving resource information from the at least one edge cloud operated to provide computing power to mobile terminal,
    wherein detection of resource information of at least one edge cloud computer of the plurality of edge cloud computer is performed by at least one edge cloud computer of the plurality of edge cloud computers,
    wherein the detected resource information is transmitted to the mobile terminal,
    wherein at least one portion of a computing capacity of at least one edge cloud computer of the plurality of edge cloud computers is provided to the mobile terminal based on the resource information,
    wherein at least one zone is determined within an edge cloud network having a reduced computing capacity, wherein, in response to a determination having a reduced computer capacity, an edge cloud computer of the plurality of edge cloud computers is provided in the determined zone to provide improved resource distribution, and/or for transmitting a request to the at least one edge cloud computer of the plurality of edge cloud computers, wherein the mobile terminal is a transportation vehicle.

9. The mobile terminal of claim 8, wherein the resource information comprises at least one of the following items of information: geographical position, connection quality, offered services, data rate, computing power, capacity utilization, service area, temporal availability, available computing capacity, reliability, waiting time, energy consumption, costs, expected route, expected speed.

10. The mobile terminal of claim 8, wherein it is possible to swap the computing power for at least one of the following system applications at the terminal: navigation, streaming, diagnostics, telematics, updates, information services, entertainment, data processing, gesture recognition, voice control, evaluation of sensor data, fusion of sensor data, calculation of driving maneuvers, driving assistance functions, driving modes in accordance with one of possible degrees of automation when operating the transportation vehicle, highly automated and/or autonomous driving.

11. The mobile terminal of claim 8, wherein the detection of the resource information at the at least one edge cloud computer of the plurality of edge cloud computers, the transmission of the resource information to the at least one terminal, and the providing of the at least one portion of a computing capacity of the at least one edge cloud computer of the plurality of edge cloud computers to the at least one terminal based on the resource information are performed in response to a request by the terminal.

12. The mobile terminal of claim 8, wherein the detection of the resource information at the at least one edge cloud computer of the plurality of edge cloud computers, the transmission of the resource information to the mobile terminal, and the providing of the at least one portion of a computing capacity of the at least one edge cloud computer of the plurality of edge cloud computers to the mobile terminal based on the resource information are performed periodically, or the detection of the resource information at the at least one edge cloud computer of the plurality of edge cloud computers, the transmission of the resource information to the mobile terminal, and the providing of the at least one portion of a computing capacity of the at least one edge cloud computer of the plurality of edge cloud computers to the mobile terminal based on the resource information are performed in response to a change in resource information and/or in a push-based state.

13. The mobile terminal of claim 8, wherein the resource information is transmitted according to a multicast, broadcast or geocast principle.

14. The mobile terminal of claim 8, wherein the at least one edge cloud computer of the plurality of edge cloud computers is a stationary and/or mobile edge node of a network, a base station of a mobile radio provider and/or a network provider, a cellphone, a smartphone, a tablet computer, a transportation vehicle and/or a drone.

15. The mobile terminal of claim 8, further comprising a management system to assign at least one application at a terminal to an edge cloud computer based on its resource information.

16. A method for operating at least one edge cloud computer of a plurality of edge cloud computers when providing a computing power to at least one mobile terminal, wherein the mobile terminal is a transportation vehicle, the method comprising:
    detecting resource information of at least one edge cloud computer of the plurality of edge cloud computers by at least one edge cloud computer of the plurality of edge cloud computers;
    transmitting the detected resource information to the at least one terminal;
    providing at least one portion of a computing capacity of at least one edge cloud computer of the plurality of edge cloud computers to the at least one terminal based on the resource information;
    determining at least one zone within an edge cloud network having a reduced computing capacity; and
    in response to a determination having a reduced computing capacity, providing an edge cloud computer of the plurality of edge cloud computers in the determined zone.

17. The method of claim 16, wherein the resource information comprises at least one of the following items of information: geographical position, connection quality, offered services, data rate, computing power, capacity utilization, service area, temporal availability, available computing capacity, reliability, waiting time, energy consumption, costs, expected route, expected speed.

18. The method of claim 16, wherein it is possible to swap the computing power for at least one of the following system applications at the terminal:
    navigation, streaming, diagnostics, telematics, updates, information services, entertainment, data processing, gesture recognition, voice control, evaluation of sensor data, fusion of sensor data, calculation of driving maneuvers, driving assistance functions, driving modes in accordance with one of possible degrees of automation when operating the transportation vehicle, highly automated and/or autonomous driving.

19. The method of claim 16, wherein the detection of the resource information at the at least one edge cloud computer of the plurality of edge cloud computers, the transmission of the resource information to the at least one terminal, and the providing of the at least one portion of a computing capacity of the at least one edge cloud computer of the plurality of edge cloud computers to the at least one terminal based on the resource information are performed in response to a request by the terminal.

20. The method of claim 16, wherein the detection of the resource information at the at least one edge cloud computer of the plurality of edge cloud computers, the transmission of the resource information to the at least one terminal, and the providing of the at least one portion of a computing capacity of the at least one edge cloud computer of the plurality of edge cloud computers to the at least one terminal based on the resource information are performed in response to a change in resource information and/or in a push-based state.

21. The method of claim 16, wherein the resource information is transmitted according to a multicast, broadcast or geocast principle.

22. The method of claim 16, wherein the at least one edge cloud computer of the plurality of edge cloud computers is a stationary and/or mobile edge node of a network, a base station of a mobile radio provider and/or a network provider, a cellphone, a smartphone, a tablet computer, a transportation vehicle and/or a drone.

* * * * *